US012739952B2

(12) United States Patent
Tobe et al.

(10) Patent No.: US 12,739,952 B2
(45) Date of Patent: Sep. 15, 2026

(54) HEAT TREATMENT APPARATUS FOR HEATING SUBSTRATE BY LIGHT IRRADIATION

(71) Applicant: SCREEN Holdings Co., Ltd., Kyoto (JP)

(72) Inventors: Ryuta Tobe, Kyoto (JP); Naoto Mori, Kyoto (JP); Takahiro Kitazawa, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 42 days.

(21) Appl. No.: 18/749,583

(22) Filed: Jun. 20, 2024

(65) Prior Publication Data

US 2025/0081302 A1 Mar. 6, 2025

(30) Foreign Application Priority Data

Aug. 30, 2023 (JP) ................................ 2023-139564

(51) Int. Cl.
*H05B 41/38* (2006.01)
*H05B 41/30* (2006.01)

(52) U.S. Cl.
CPC ............ *H05B 41/38* (2013.01); *H05B 41/30* (2013.01)

(58) Field of Classification Search
CPC ... H05B 41/38; H05B 41/30; H01L 21/67115; H01L 21/67017; H01L 21/67207;
(Continued)

(56) References Cited

U.S. PATENT DOCUMENTS

2009/0067823 A1 3/2009 Kusuda
2009/0072947 A1* 3/2009 Onishi .................. H04J 13/00 340/5.72

(Continued)

FOREIGN PATENT DOCUMENTS

JP 2009-070948 A 4/2009
JP 2011-119562 A 6/2011

(Continued)

OTHER PUBLICATIONS

Request for the Submission of an Opinion dated May 15, 2025 in corresponding Korean Patent Application No. 10-2024-0111290 and English language translation.

(Continued)

*Primary Examiner* — Abdullah A Riyami
*Assistant Examiner* — Syed M Kaiser
(74) *Attorney, Agent, or Firm* — OSTROLENK FABER LLP

(57) ABSTRACT

An element set including one capacitor, one coil, one thyristor, and one regeneration diode is provided for three parallel-connected flash lamps. The one thyristor collectively effects on-off control of the current flowing through the three corresponding parallel-connected flash lamps. The thyristor is able to suppress a tail current flowing through the flash lamps during flash irradiation. Since a smaller number of element sets than the number of parallel-connected flash lamps are provided, the number of elements provided in a heat treatment apparatus is reduced as compared to the case in which individual element sets are provided for the flash lamps. This suppresses the increase in apparatus costs and reduces the installation space for the elements.

4 Claims, 8 Drawing Sheets

(58) Field of Classification Search
CPC ......... H01L 21/67248; H01L 21/68742; H01L 21/68785; H01L 2924/1302
See application file for complete search history.

(56) References Cited

U.S. PATENT DOCUMENTS

| | | | | |
|---|---|---|---|---|
| 2009/0166351 | A1* | 7/2009 | Yokomori | F27D 11/12 392/416 |
| 2011/0262115 | A1* | 10/2011 | Yokouchi | H10P 95/90 392/407 |
| 2012/0244725 | A1* | 9/2012 | Fuse | H10P 30/204 257/E21.333 |
| 2013/0260546 | A1* | 10/2013 | Yamada | H10P 32/12 392/416 |
| 2014/0206108 | A1 | 7/2014 | Kiyama | |
| 2016/0079085 | A1 | 3/2016 | Aoyama et al. | |
| 2017/0120532 | A1* | 5/2017 | Kozlak | B33Y 40/20 |
| 2018/0144939 | A1 | 5/2018 | Tanimura et al. | |
| 2019/0006215 | A1* | 1/2019 | Aoyama | H10P 72/0434 |
| 2019/0206687 | A1 | 7/2019 | Fuse et al. | |
| 2020/0126807 | A1* | 4/2020 | Ikeda | H10P 72/3306 |
| 2022/0172951 | A1 | 6/2022 | Shigemasu et al. | |

FOREIGN PATENT DOCUMENTS

| | | | | | |
|---|---|---|---|---|---|
| JP | 4816634 | B2 | | 11/2011 | |
| JP | 5034959 | B2 | | 9/2012 | |
| KR | 20090072947 | A | * | 7/2009 | H01L 21/2686 |
| KR | 2017-0120532 | A | | 10/2017 | |
| KR | 10-2018-0021023 | A | | 2/2018 | |
| KR | 10-2018-0056385 | A | | 5/2018 | |
| KR | 10-2021-0127726 | A | | 10/2021 | |
| TW | 201431120 | A | | 8/2014 | |

OTHER PUBLICATIONS

Office Action with Search Report dated Feb. 25, 2025 in corresponding Taiwanese Patent Application No. 113129284 and an English language machine translation made from the Japanese translation of the original communication.

Notice of Decision to Grant dated Jan. 22, 2026 in corresponding Korean Patent Application No. 10-2024-0111290.

* cited by examiner

HEAT TREATMENT APPARATUS FOR HEATING SUBSTRATE BY LIGHT IRRADIATION

BACKGROUND OF THE INVENTION

Field of the Invention

The present invention relates to a heat treatment apparatus which irradiates a substrate with a flash of light to heat the substrate. Examples of the substrate to be treated include a semiconductor wafer, a substrate for a liquid crystal display device, a substrate for a flat panel display (FPD), a substrate for an optical disk, a substrate for a magnetic disk, and a substrate for a solar cell.

Description of the Background Art

In the process of manufacturing a semiconductor device, attention has been given to flash lamp annealing (FLA) which heats a semiconductor wafer in an extremely short time. The flash lamp annealing is a heat treatment technique in which xenon flash lamps (the term "flash lamp" as used hereinafter refers to a "xenon flash lamp") are used to irradiate a surface of a semiconductor wafer with a flash of light, thereby raising the temperature of only the surface of the semiconductor wafer in an extremely short time (several milliseconds or less).

The xenon flash lamps have a spectral distribution of radiation ranging from ultraviolet to near-infrared regions. The wavelength of light emitted from the xenon flash lamps is shorter than that of light emitted from conventional halogen lamps, and approximately coincides with a fundamental absorption band of a silicon semiconductor wafer. Thus, when a semiconductor wafer is irradiated with a flash of light emitted from the xenon flash lamps, the temperature of the semiconductor wafer can be raised rapidly, with only a small amount of light transmitted through the semiconductor wafer. Also, it has turned out that flash irradiation, that is, the irradiation of a semiconductor wafer with a flash of light in an extremely short time of several milliseconds or less allows a selective temperature rise only near the surface of the semiconductor wafer.

Such flash lamp annealing is used for processes that require heating in an extremely short time, e.g. typically for the activation of impurities implanted in a semiconductor wafer. The irradiation of the surface of the semiconductor wafer implanted with impurities by an ion implantation process with a flash of light emitted from the flash lamps allows the temperature rise in the surface of the semiconductor wafer to an activation temperature only for an extremely short time, thereby achieving only the activation of the impurities without deep diffusion of the impurities.

U.S. Patent Application Publication No. 2009/0067823 and Japanese Patent Application Laid-Open No. 2011-119562 disclose heat treatment apparatuses employing such xenon flash lamps in which an insulated-gate bipolar transistor (IGBT) is provided in a discharge circuit for a flash lamp to control the emission of light from the flash lamp. In the apparatuses disclosed in U.S. Patent Application Publication No. 2009/0067823 and Japanese Patent Application Laid-Open No. 2011-119562, a predetermined pulse signal is inputted to the gate of the IGBT to define the waveform of current flowing through the flash lamp. This controls the lamp light emission to freely adjust the light emission time and light emission intensity of the flash lamp. In the apparatuses disclosed in U.S. Patent Application Publication No. 2009/0067823 and Japanese Patent Application Laid-Open No. 2011-119562, the flash lamps and IGBTs are connected in series in a one-to-one relationship.

In recent manufacturing processes for advanced semiconductors, annealing techniques capable of achieving low thermal history while heating to high temperatures have been required to respond to changes in materials and structures. Low thermal history annealing is a heat treatment in which the total amount of heat inputted to a semiconductor wafer is small. The flash lamp annealing is required to abruptly raise the surface temperature of a semiconductor wafer to high temperatures in a shorter time. To achieve this, it is necessary to irradiate the semiconductor wafer surface with intense flashes of light in a shorter irradiation time. For example, flash irradiation for an irradiation time period of 0.1 msec is required to raise the temperature of the semiconductor wafer surface by not less than 600° C.

However, for the purpose of significantly raising the temperature of the semiconductor wafer surface by the flash irradiation for an extremely short irradiation time period, it is necessary to considerably increase the number of flash lamps. This creates a need for the provision of a large number of elements including IGBTs and the like in corresponding relation to the number of flash lamps. The provision of a large number of elements including IGBTs and the like results in increases in apparatus costs and in installation space.

SUMMARY

The present invention is intended for a heat treatment apparatus for irradiating a substrate with a flash of light to heat the substrate.

According to one aspect of the present invention, the heat treatment apparatus comprises: a chamber for receiving a substrate therein; a holder for holding the substrate in the chamber; a plurality of flash lamps for irradiating the substrate held by the holder with a flash of light; a discharge circuit for passing current through the plurality of flash lamps to cause the plurality of flash lamps to emit light; and a controller for controlling the discharge circuit, the discharge circuit including M element sets for N parallel-connected flash lamps, where M is an integer less than N, and N is an integer not less than 2.

The number of elements provided in the heat treatment apparatus is reduced as compared to the case in which individual element sets are provided for the flash lamps.

It is therefore an object of the present invention to reduce the number of elements in an apparatus.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described in detail with reference to the drawings. In the following description, expressions indicating relative or absolute positional relationships (e.g., "in one direction", "along one direction", "parallel", "orthogonal", "center", "concentric", and "coaxial") shall represent not only the exact positional relationships but also a state in which the angle or distance is relatively displaced to the extent that tolerances or similar functions are obtained, unless otherwise specified. Also, expressions indicating equal states (e.g., "identical", "equal", and "homogeneous") shall represent not only a state of quantitatively exact equality but also a state in which there are differences that provide tolerances or similar functions, unless otherwise specified. Also, expressions indicating shapes (e.g., "circular", "rectangular", and "cylindrical") shall represent not only the geometrically exact shapes but also shapes to the extent that the same level of effectiveness is obtained, unless otherwise specified, and may have unevenness or chamfers. Also, an expression such as "comprising", "equipped with", "provided with", "including", or "having" a component is not an exclusive expression that excludes the presence of other components. Also, the expression "at least one of A, B, and C" includes "A only", "B only", "C only", "any two of A, B, and C", and "all of A, B, and C".

Figure 1:
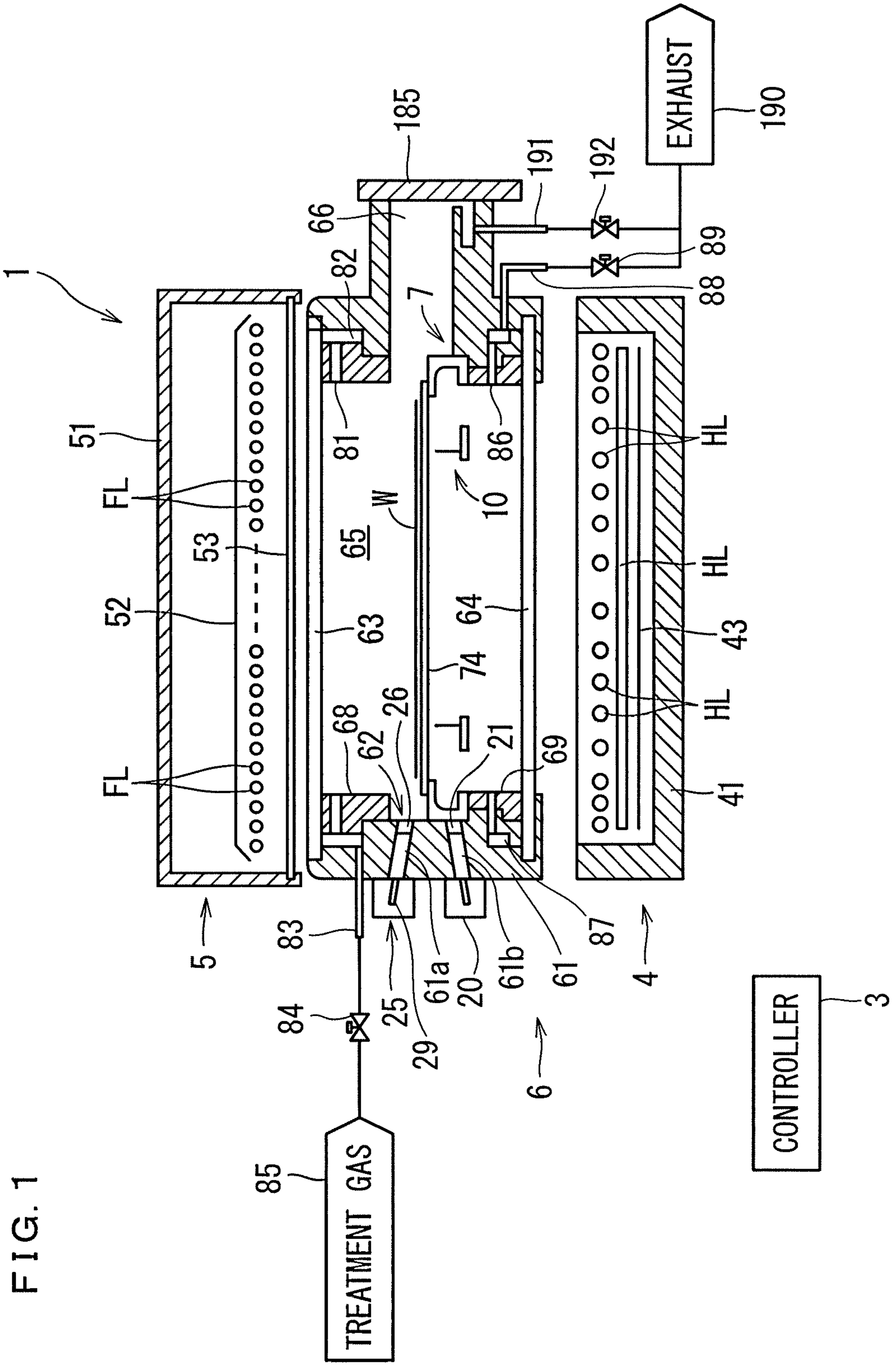
FIG. 1 is a longitudinal sectional view showing a configuration of a heat treatment apparatus according to the present invention.

FIG. 1 is a longitudinal sectional view showing a configuration of a heat treatment apparatus 1 according to the present invention. The heat treatment apparatus 1 of FIG. 1 is a flash lamp annealer for irradiating a disk-shaped semiconductor wafer W serving as a substrate with flashes of light to heat the semiconductor wafer W. The size of the semiconductor wafer W to be treated is not particularly limited. For example, the semiconductor wafer W to be treated has a diameter of 300 mm and 450 mm (in the present preferred embodiment, 300 mm). The semiconductor wafer W prior to the transport into the heat treatment apparatus 1 is implanted with impurities. The heat treatment apparatus 1 performs a heating treatment on the semiconductor wafer W to thereby activate the impurities implanted in the semiconductor wafer W. It should be noted that the dimensions of components and the number of components are shown in exaggeration or in simplified form, as appropriate, in FIG. 1 and the subsequent figures for the sake of easier understanding.

The heat treatment apparatus 1 includes a chamber 6 for receiving a semiconductor wafer W therein, a flash heating part 5 including a plurality of built-in flash lamps FL, and a halogen heating part 4 including a plurality of built-in halogen lamps HL. The flash heating part 5 is provided over the chamber 6, and the halogen heating part 4 is provided under the chamber 6. The heat treatment apparatus 1 further includes a holder 7 provided inside the chamber 6 and for holding a semiconductor wafer W in a horizontal attitude, and a transfer mechanism 10 provided inside the chamber 6 and for transferring a semiconductor wafer W between the holder 7 and the outside of the heat treatment apparatus 1. The heat treatment apparatus 1 further includes a controller 3 for controlling operating mechanisms provided in the halogen heating part 4, the flash heating part 5, and the chamber 6 to cause the operating mechanisms to heat-treat a semiconductor wafer W.

The chamber 6 is configured such that upper and lower chamber windows 63 and 64 made of quartz are mounted to the top and bottom, respectively, of a tubular chamber side portion 61. The chamber side portion 61 has a generally tubular shape having an open top and an open bottom. The upper chamber window 63 is mounted to block the top opening of the chamber side portion 61, and the lower chamber window 64 is mounted to block the bottom opening thereof. The upper chamber window 63 forming the ceiling of the chamber 6 is a disk-shaped member made of quartz, and serves as a quartz window that transmits flashes of light emitted from the flash heating part 5 therethrough into the chamber 6. The lower chamber window 64 forming the floor of the chamber 6 is also a disk-shaped member made of quartz, and serves as a quartz window that transmits light emitted from the halogen heating part 4 therethrough into the chamber 6.

An upper reflective ring 68 is mounted to an upper portion of the inner wall surface of the chamber side portion 61, and a lower reflective ring 69 is mounted to a lower portion thereof. Both of the upper and lower reflective rings 68 and 69 are in the form of an annular ring. The upper reflective ring 68 is mounted by being inserted downwardly from the top of the chamber side portion 61. The lower reflective ring 69, on the other hand, is mounted by being inserted upwardly from the bottom of the chamber side portion 61 and fastened with screws not shown. In other words, the upper and lower reflective rings 68 and 69 are removably mounted to the chamber side portion 61. An interior space of the chamber 6, i.e. a space surrounded by the upper chamber window 63, the lower chamber window 64, the chamber side portion 61, and the upper and lower reflective rings 68 and 69, is defined as a heat treatment space 65.

A recessed portion 62 is defined in the inner wall surface of the chamber 6 by mounting the upper and lower reflective rings 68 and 69 to the chamber side portion 61. Specifically, the recessed portion 62 is defined which is surrounded by a middle portion of the inner wall surface of the chamber side portion 61 where the reflective rings 68 and 69 are not mounted, a lower end surface of the upper reflective ring 68, and an upper end surface of the lower reflective ring 69. The recessed portion 62 is provided in the form of a horizontal annular ring in the inner wall surface of the chamber 6, and surrounds the holder 7 which holds a semiconductor wafer W. The chamber side portion 61 and the upper and lower reflective rings 68 and 69 are made of a metal material (e.g., stainless steel) with high strength and high heat resistance.

The chamber side portion 61 is provided with a transport opening (throat) 66 for the transport of a semiconductor wafer W therethrough into and out of the chamber 6. The transport opening 66 is openable and closable by a gate valve 185. The transport opening 66 is connected in communication with an outer peripheral surface of the recessed portion 62. Thus, when the transport opening 66 is opened by the gate valve 185, a semiconductor wafer W is allowed to be transported through the transport opening 66 and the recessed portion 62 into and out of the heat treatment space 65. When the transport opening 66 is closed by the gate valve 185, the heat treatment space 65 in the chamber 6 is an enclosed space.

The chamber side portion 61 is further provided with a through hole **61*a* and a through hole 61*b* both bored therein. The through hole 61*a* is a cylindrical hole for directing infrared light emitted from an upper surface of a semiconductor wafer W held by a susceptor 74 to be described later therethrough to an infrared sensor 29 of an upper radiation thermometer 25. The through hole 61***b* is a cylindrical hole for directing infrared light emitted from a lower surface of the semiconductor wafer W therethrough to a lower radiation thermometer 20. The through holes 61*a* and 61*b* are inclined with respect to a horizontal direction so that the longitudinal axes (axes extending in respective directions in which the through holes 61*a* and 61*b* extend through the chamber side portion 61) of the respective through holes 61*a* and 61*b* intersect main surfaces of the semiconductor wafer W held by the susceptor 74. A transparent window 26 made of calcium fluoride material transparent to infrared light in a wavelength range measurable by the upper radiation thermometer 25 is mounted to an end portion of the through hole 61*a* which faces the heat treatment space 65. A transparent window 21 made of barium fluoride material transparent to infrared light in a wavelength range measurable by the lower radiation thermometer 20 is mounted to an end portion of the through hole 61*b* which faces the heat treatment space 65.

At least one gas supply opening 81 for supplying a treatment gas therethrough into the heat treatment space 65 is provided in an upper portion of the inner wall of the chamber 6. The gas supply opening 81 is provided above the recessed portion 62, and may be provided in the upper reflective ring 68. The gas supply opening 81 is connected in communication with a gas supply pipe 83 through a buffer space 82 provided in the form of an annular ring inside the side wall of the chamber 6. The gas supply pipe 83 is connected to a treatment gas supply source 85. A valve 84 is interposed in the gas supply pipe 83. When the valve 84 is opened, the treatment gas is fed from the treatment gas supply source 85 to the buffer space 82. The treatment gas flowing in the buffer space 82 flows in a spreading manner within the buffer space 82 which is lower in fluid resistance than the gas supply opening 81, and is supplied through the gas supply opening 81 into the heat treatment space 65. Examples of the treatment gas usable herein include inert gases such as nitrogen gas ($N_2$), reactive gases such as hydrogen ($H_2$) and ammonia ($NH_3$), and mixtures of these gases (although nitrogen gas is used in the present preferred embodiment).

At least one gas exhaust opening 86 for exhausting a gas from the heat treatment space 65 is provided in a lower portion of the inner wall of the chamber 6. The gas exhaust opening 86 is provided below the recessed portion 62, and may be provided in the lower reflective ring 69. The gas exhaust opening 86 is connected in communication with a gas exhaust pipe 88 through a buffer space 87 provided in the form of an annular ring inside the side wall of the chamber 6. The gas exhaust pipe 88 is connected to an exhaust part 190. A valve 89 is interposed in the gas exhaust pipe 88. When the valve 89 is opened, the gas in the heat treatment space 65 is exhausted through the gas exhaust opening 86 and the buffer space 87 to the gas exhaust pipe 88. The at least one gas supply opening 81 and the at least one gas exhaust opening 86 may include a plurality of gas supply openings 81 and a plurality of gas exhaust openings 86, respectively, arranged in a circumferential direction of the chamber 6, and may be in the form of slits. The treatment gas supply source 85 and the exhaust part 190 may be mechanisms provided in the heat treatment apparatus 1 or be utility systems in a factory in which the heat treatment apparatus 1 is installed.

A gas exhaust pipe 191 for exhausting the gas from the heat treatment space 65 is also connected to a distal end of the transport opening 66. The gas exhaust pipe 191 is connected through a valve 192 to the exhaust part 190. By opening the valve 192, the gas in the chamber 6 is exhausted through the transport opening 66.

Figure 2:
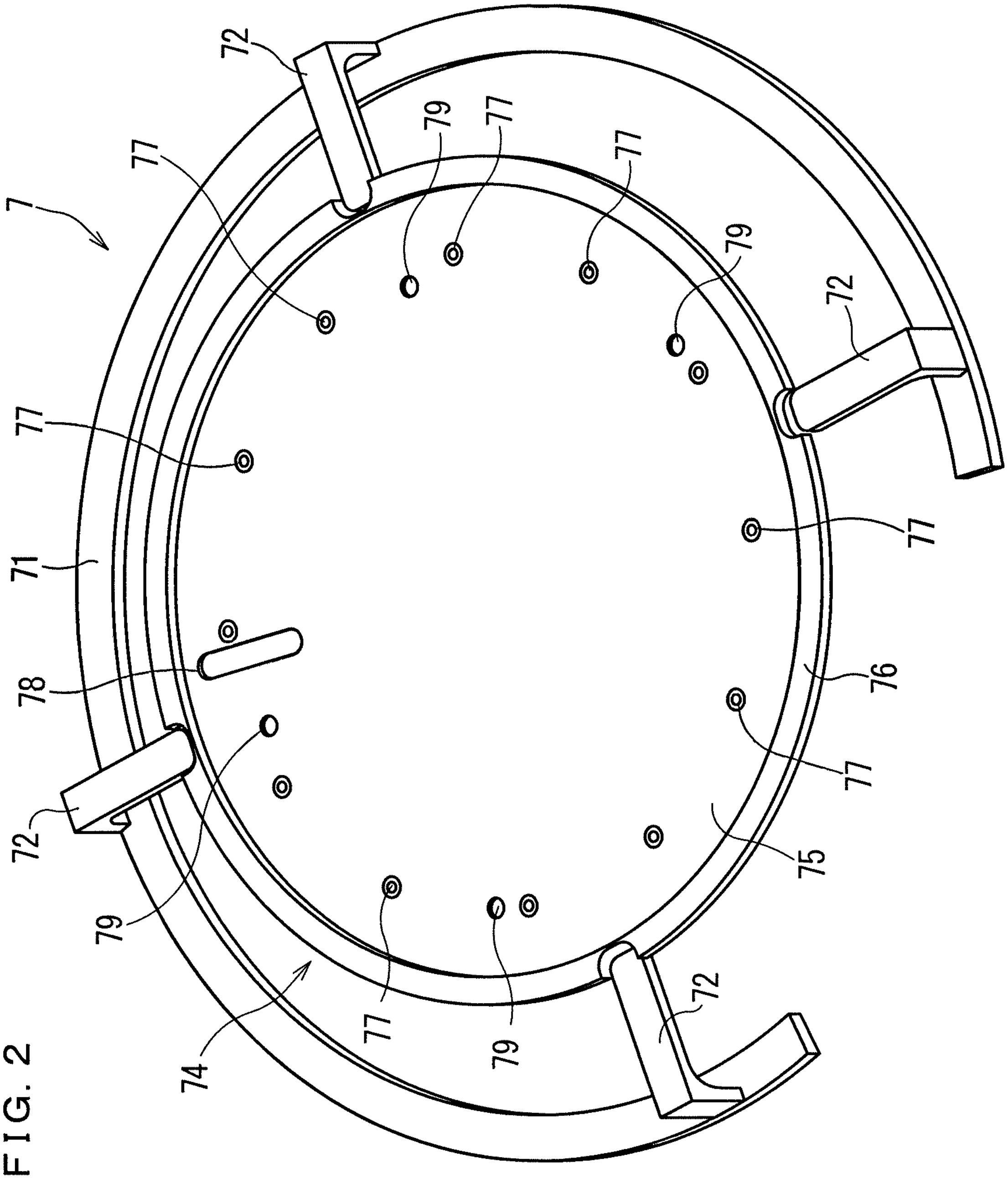
FIG. 2 is a perspective view showing the entire external appearance of a holder.

FIG. 2 is a perspective view showing the entire external appearance of the holder 7. The holder 7 holds a semiconductor wafer W within the chamber 6. The holder 7 includes a base ring 71, coupling portions 72, and the susceptor 74. The base ring 71, the coupling portions 72, and the susceptor 74 are all made of quartz. In other words, the whole of the holder 7 is made of quartz.

The base ring 71 is a quartz member having an arcuate shape obtained by removing a portion from an annular shape. This removed portion is provided to prevent interference between transfer arms 11 of the transfer mechanism 10 to be described later and the base ring 71. The base ring 71 is supported by the wall surface of the chamber 6 by being placed on the bottom surface of the recessed portion 62 (with reference to FIG. 1). The multiple coupling portions 72 (in the present preferred embodiment, four coupling portions 72) are mounted upright on the upper surface of the base ring 71 and arranged in a circumferential direction of the annular shape thereof. The coupling portions 72 are quartz members, and are rigidly secured to the base ring 71 by welding.

Figure 3:
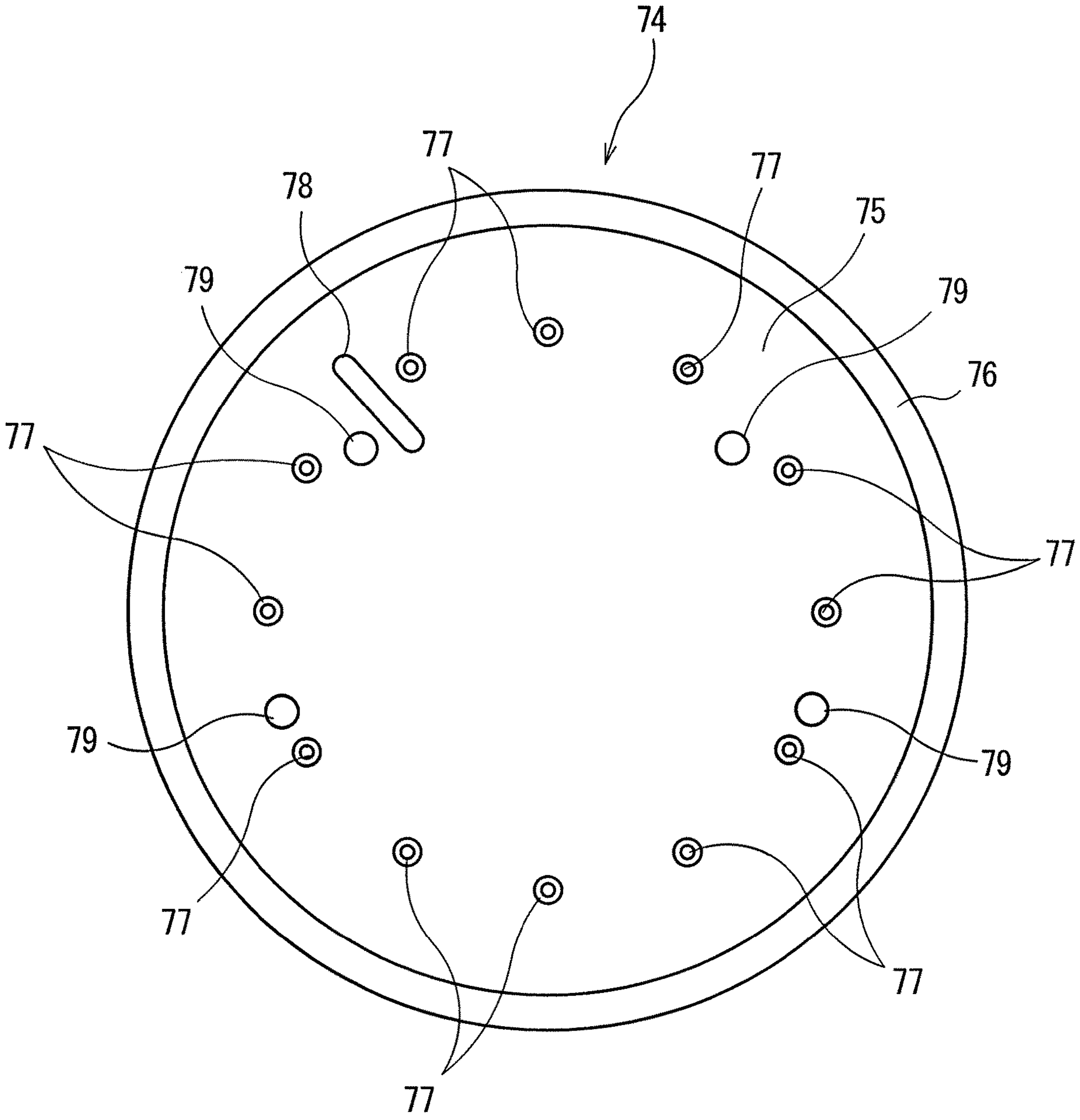
FIG. 3 is a plan view of a susceptor.
Figure 4:
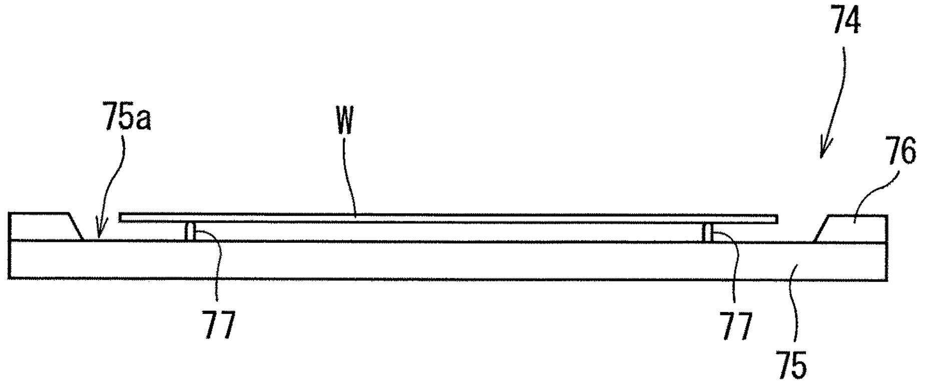
FIG. 4 is a sectional view of the susceptor.

The susceptor 74 is supported by the four coupling portions 72 provided on the base ring 71. FIG. 3 is a plan view of the susceptor 74. FIG. 4 is a sectional view of the susceptor 74. The susceptor 74 includes a holding plate 75, a guide ring 76, and a plurality of substrate support pins 77. The holding plate 75 is a generally circular planar member made of quartz. The diameter of the holding plate 75 is greater than that of a semiconductor wafer W. In other words, the holding plate 75 has a size, as seen in plan view, greater than that of the semiconductor wafer W.

The guide ring 76 is provided on a peripheral portion of the upper surface of the holding plate 75. The guide ring 76 is an annular member having an inner diameter greater than the diameter of the semiconductor wafer W. For example, when the diameter of the semiconductor wafer W is 300 mm, the inner diameter of the guide ring 76 is 320 mm. The inner periphery of the guide ring 76 is in the form of a tapered surface which becomes wider in an upward direction from the holding plate 75. The guide ring 76 is made of quartz similar to that of the holding plate 75. The guide ring 76 may be welded to the upper surface of the holding plate 75 or fixed to the holding plate 75 with separately machined pins and the like. Alternatively, the holding plate 75 and the guide ring 76 may be machined as an integral member.

A region of the upper surface of the holding plate 75 which is inside the guide ring 76 serves as a planar holding surface 75*a* for holding the semiconductor wafer W. The substrate support pins 77 are provided upright on the holding surface 75*a* of the holding plate 75. In the present preferred embodiment, a total of 12 substrate support pins 77 are spaced at intervals of 30 degrees along the circumference of a circle concentric with the outer circumference of the holding surface 75*a* (the inner circumference of the guide ring 76). The diameter of the circle on which the 12 substrate support pins 77 are disposed (the distance between opposed ones of the substrate support pins 77) is smaller than the diameter of the semiconductor wafer W, and is 270 to 280 mm (in the present preferred embodiment, 270 mm) when the diameter of the semiconductor wafer W is 300 mm. Each of the substrate support pins 77 is made of quartz. The substrate support pins 77 may be provided by welding on the upper surface of the holding plate 75 or machined integrally with the holding plate 75.

Referring again to FIG. 2, the four coupling portions 72 provided upright on the base ring 71 and the peripheral portion of the holding plate 75 of the susceptor 74 are rigidly secured to each other by welding. In other words, the susceptor 74 and the base ring 71 are fixedly coupled to each other with the coupling portions 72. The base ring 71 of such a holder 7 is supported by the wall surface of the chamber 6, whereby the holder 7 is mounted to the chamber 6. With the holder 7 mounted to the chamber 6, the holding plate 75 of the susceptor 74 assumes a horizontal attitude (an attitude such that the normal to the holding plate 75 coincides with a vertical direction). In other words, the holding surface 75*a* of the holding plate 75 becomes a horizontal surface.

A semiconductor wafer W transported into the chamber 6 is placed and held in a horizontal attitude on the susceptor 74 of the holder 7 mounted to the chamber 6. At this time, the semiconductor wafer W is supported by the 12 substrate support pins 77 provided upright on the holding plate 75, and is held by the susceptor 74. More strictly speaking, the 12 substrate support pins 77 have respective upper end portions coming in contact with the lower surface of the semiconductor wafer W to support the semiconductor wafer W. The semiconductor wafer W is supported in a horizontal attitude by the 12 substrate support pins 77 because the 12 substrate support pins 77 have a uniform height (distance from the upper ends of the substrate support pins 77 to the holding surface 75*a* of the holding plate 75).

The semiconductor wafer W supported by the substrate support pins 77 is spaced a predetermined distance apart from the holding surface 75*a* of the holding plate 75. The thickness of the guide ring 76 is greater than the height of the substrate support pins 77. Thus, the guide ring 76 prevents the horizontal misregistration of the semiconductor wafer W supported by the substrate support pins 77.

As shown in FIGS. 2 and 3, an opening 78 is provided in the holding plate 75 of the susceptor 74 so as to extend vertically through the holding plate 75 of the susceptor 74. The opening 78 is provided for the lower radiation thermometer 20 to receive radiation (infrared light) emitted from the lower surface of the semiconductor wafer W. Specifically, the lower radiation thermometer 20 receives the radiation emitted from the lower surface of the semiconductor wafer W through the opening 78 and the transparent window 21 mounted to the through hole 61*b* in the chamber side portion 61 to measure the temperature of the semiconductor wafer W. Further, the holding plate 75 of the susceptor 74 further includes four through holes 79 bored therein and designed so that lift pins 12 of the transfer mechanism 10 to be described later pass through the through holes 79, respectively, to transfer a semiconductor wafer W.

Figure 5:
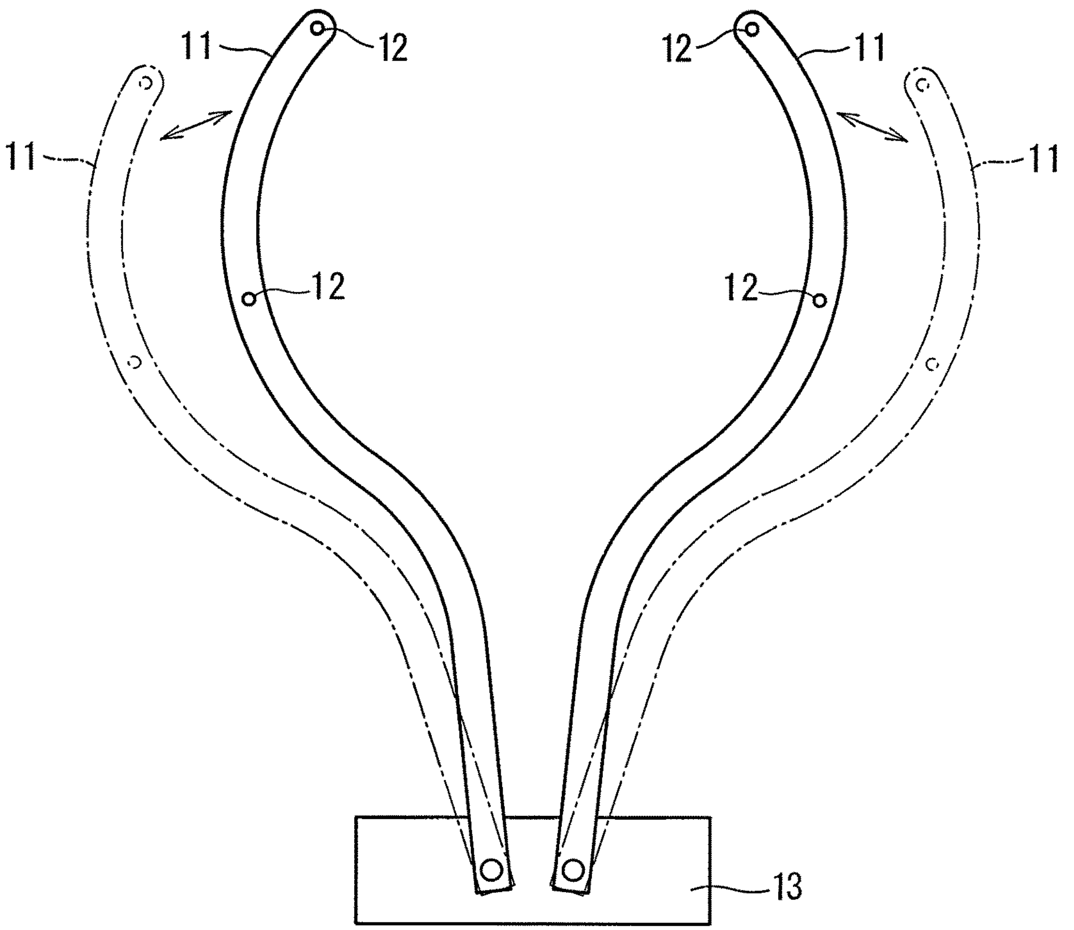
FIG. 5 is a plan view of a transfer mechanism.
Figure 6:
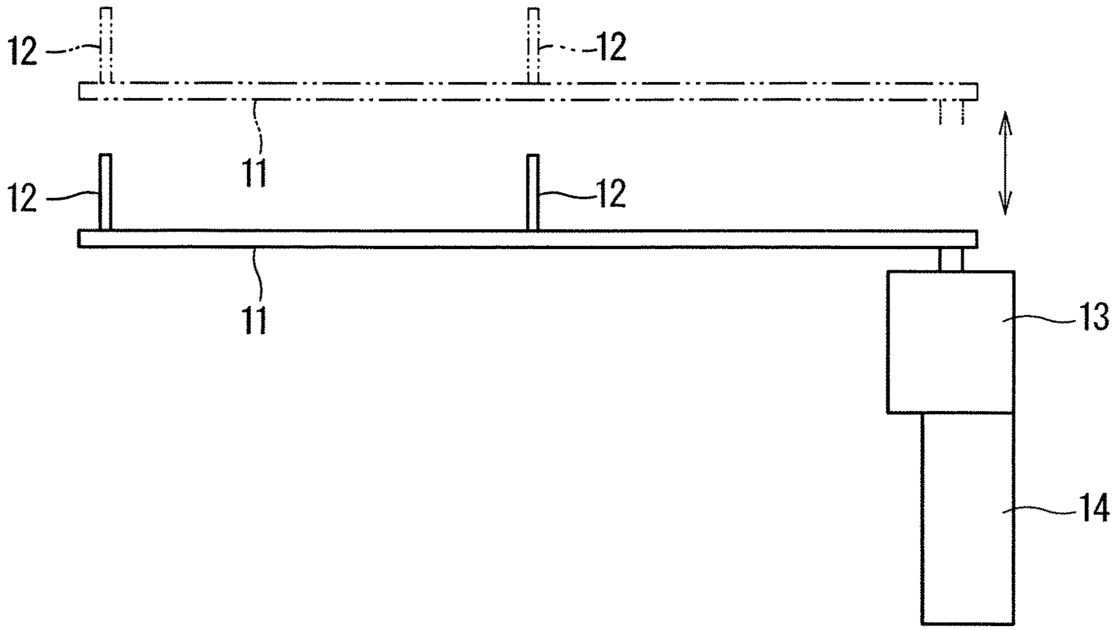
FIG. 6 is a side view of the transfer mechanism.

FIG. 5 is a plan view of the transfer mechanism 10. FIG. 6 is a side view of the transfer mechanism 10. The transfer mechanism 10 includes the two transfer arms 11. The transfer arms 11 are of an arcuate configuration extending substantially along the annular recessed portion 62. Each of the transfer arms 11 includes the two lift pins 12 mounted upright thereon. The transfer arms 11 and the lift pins 12 are made of quartz. The transfer arms 11 are pivotable by a horizontal movement mechanism 13. The horizontal movement mechanism 13 moves the pair of transfer arms 11 horizontally between a transfer operation position (a position indicated by solid lines in FIG. 5) in which a semiconductor wafer W is transferred to and from the holder 7 and a retracted position (a position indicated by dash-double-dot lines in FIG. 5) in which the transfer arms 11 do not overlap the semiconductor wafer W held by the holder 7 as seen in plan view. The horizontal movement mechanism 13 may be of the type which causes individual motors to pivot the transfer arms 11 respectively or of the type which uses a linkage mechanism to cause a single motor to pivot the pair of transfer arms 11 in cooperative relation.

The transfer arms 11 are moved upwardly and downwardly together with the horizontal movement mechanism 13 by an elevating mechanism 14. As the elevating mechanism 14 moves up the pair of transfer arms 11 in their transfer operation position, the four lift pins 12 in total pass through the respective four through holes 79 (with reference to FIGS. 2 and 3) bored in the susceptor 74, so that the upper ends of the lift pins 12 protrude from the upper surface of the susceptor 74. On the other hand, as the elevating mechanism 14 moves down the pair of transfer arms 11 in their transfer operation position to take the lift pins 12 out of the respective through holes 79 and the horizontal movement mechanism 13 moves the pair of transfer arms 11 so as to open the transfer arms 11, the transfer arms 11 move to their retracted position. The retracted position of the pair of transfer arms 11 is immediately over the base ring 71 of the holder 7. The retracted position of the transfer arms 11 is inside the recessed portion 62 because the base ring 71 is placed on the bottom surface of the recessed portion 62. An exhaust mechanism not shown is also provided near the location where the drivers (the horizontal movement mechanism 13 and the elevating mechanism 14) of the transfer mechanism 10 are provided, and is configured to exhaust an atmosphere around the drivers of the transfer mechanism 10 to the outside of the chamber 6.

Referring again to FIG. 1, the chamber 6 is provided with the two radiation thermometers (in the present preferred embodiment, pyrometers): the upper radiation thermometer 25 and the lower radiation thermometer 20. The upper radiation thermometer 25 is provided obliquely above the semiconductor wafer W held by the susceptor 74, and receives the infrared radiation emitted from the upper surface of the semiconductor wafer W to measure the temperature of the upper surface of the semiconductor wafer W. The infrared sensor 29 of the upper radiation thermometer 25 includes an optical element made of InSb (indium antimonide) so as to be able to respond to rapid changes in temperature of the upper surface of the semiconductor wafer W at the moment of flash irradiation. On the other hand, the lower radiation thermometer 20 is provided obliquely below the semiconductor wafer W held by the susceptor 74, and receives the infrared radiation emitted from the lower surface of the semiconductor wafer W to measure the temperature of the lower surface of the semiconductor wafer W.

The flash heating part 5 provided over the chamber 6 includes an enclosure 51, a light source provided inside the enclosure 51 and including the multiple (in the present preferred embodiment, 63) xenon flash lamps FL, and a reflector 52 provided inside the enclosure 51 so as to cover the light source from above. The flash lamps FL irradiate the semiconductor wafer W held by the holder 7 with flashes of light. The flash heating part 5 further includes a lamp light radiation window 53 mounted to the bottom of the enclosure 51. The lamp light radiation window 53 forming the floor of the flash heating part 5 is a plate-like quartz window made of quartz. The flash heating part 5 is provided over the chamber 6, whereby the lamp light radiation window 53 is opposed to the upper chamber window 63. The flash lamps FL direct flashes of light from over the chamber 6 through the lamp light radiation window 53 and the upper chamber window 63 toward the heat treatment space 65.

The flash lamps FL, each of which is a rod-shaped lamp having an elongated cylindrical shape, are arranged in a plane so that the longitudinal directions of the respective flash lamps FL are in parallel with each other along a main surface of a semiconductor wafer W held by the holder 7 (that is, in a horizontal direction). Thus, a plane defined by the arrangement of the flash lamps FL is also a horizontal plane. The flash lamps FL may be arranged in two or more tiers.

Figure 8:
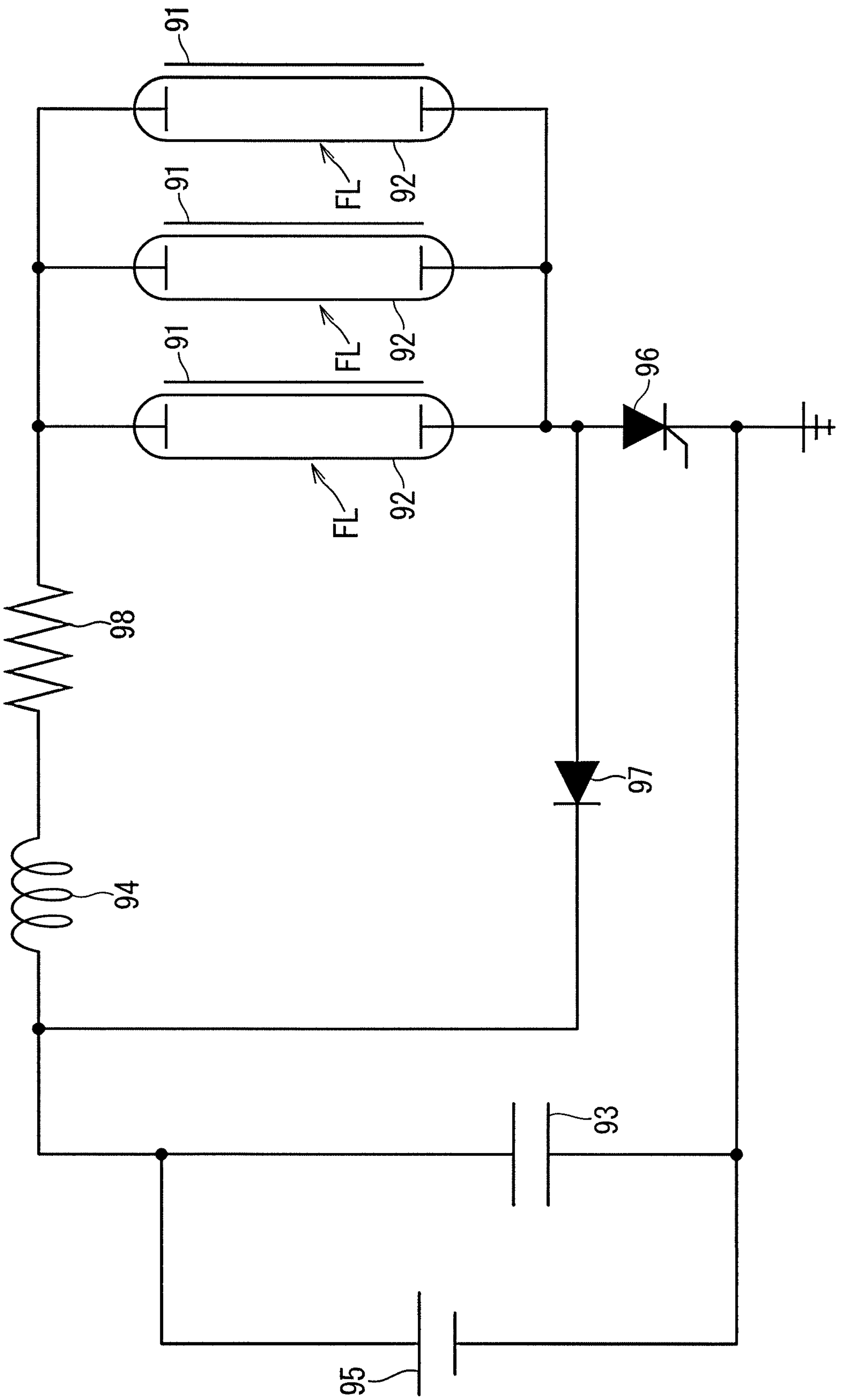
FIG. 8 is a diagram showing a discharge circuit for flash lamps.

FIG. 8 is a diagram showing a discharge circuit for flash lamps FL. This discharge circuit passes current through the flash lamps FL to cause the flash lamps FL to emit light. As shown in FIG. 8, the multiple flash lamps FL (in the present preferred embodiment, three flash lamps FL) are connected in parallel. A capacitor 93, a coil 94, and a thyristor 96 are connected in series with the three flash lamps FL. In other words, one element set including the capacitor 93, the coil 94, and the thyristor 96 is provided for the three flash lamps FL.

Each of the flash lamps FL includes a rod-shaped glass tube (discharge tube) 92 containing xenon gas sealed therein and having positive and negative electrodes provided on opposite ends thereof, and a trigger electrode 91 attached to the outer peripheral surface of the glass tube 92. A trigger circuit not shown is capable of applying a high voltage to the trigger electrode 91. The timing of the voltage application from the trigger circuit to the trigger electrode 91 is controlled by the controller 3.

The capacitor 93 is a passive element which accumulates an electric charge for producing an electrical discharge in the flash lamps FL. A power supply unit 95 applies a predetermined voltage to the capacitor 93, and the capacitor 93 is charged in accordance with the applied voltage (charging voltage). The coil 94 is a passive element which resists abrupt changes, if any, in current in the discharge circuit. In the circuit of FIG. 8, a stray resistor (parasitic resistor) 98 is provided in series with the flash lamps FL. The stray resistor 98 is not provided as an element, but is an unavoidable resistor in the circuit.

The thyristor 96 is an active element which controls the current flowing through the three flash lamps FL. The thyristor 96 in the present preferred embodiment is, for example, a GCT (Gate Commutated Turn off) thyristor. The GCT thyristor is obtained by improving the gate of a GTO (Gate Turn Off) thyristor. Like the GTO thyristor, the GCT thyristor hence has a self extinction function that makes a transition from an ON state to an OFF state by providing a negative signal to the gate thereof. In addition, the GCT thyristor has the function of making a transition from the OFF state to the ON state by providing a positive signal to the gate thereof as a basic function of the thyristor. In other words, the thyristor 96 is a switching element having a switching function of being turned on and off depending on the signal applied to the gate thereof. The current flowing through the flash lamps FL is turned on and off by turning on and off the thyristor 96.

Even if, with the capacitor 93 in the charged state, the thyristor 96 turns on to apply a high voltage across the electrodes of the glass tube 92, no electricity will flow through the glass tube 92 in a normal state because the xenon gas is electrically insulative. However, when a high voltage is applied to the trigger electrode 91 to produce an electrical breakdown, an electrical discharge between the electrodes causes a current to flow momentarily in the glass tube 92, so that xenon atoms or molecules are excited at this time to cause light emission. The light emitted from the glass tube 92 by such a momentary discharge is a flash of light.

In the present preferred embodiment, the thyristor 96 is connected in series with the flash lamps FL. For this reason, when the thyristor 96 turns off, a coil surge is generated such that an instantaneous large voltage is generated in the reverse direction in the coil 94 by an abrupt change in current. There is a danger that a high voltage due to such a coil surge destroys other circuit elements. To prevent this, a regeneration diode (flywheel diode) 97 is provided in the discharge circuit so as to absorb the high voltage due to the coil surge, as shown in FIG. 8. This regeneration diode 97 protects the elements in the discharge circuit from the coil surge.

As shown in FIG. 8, one element set is provided for the three flash lamps FL connected in parallel in the present preferred embodiment. One element set includes one capacitor 93, one coil 94, one thyristor 96, and one regeneration diode 97. In the example of the present preferred embodiment, the 63 flash lamps FL are provided in the flash heating part 5. Accordingly, 21 (=63/3) element sets are provided in the heat treatment apparatus 1, so that 21 capacitors 93, 21 coils 94, 21 thyristors 96, and 21 regeneration diodes 97 are provided for the 63 flash lamps FL. Each of the thyristors 96 collectively effects on-off control of the currents flowing through the three corresponding parallel-connected flash lamps FL. In other words, the currents flowing through the 63 flash lamps FL are individually turned on and off by the corresponding thyristors 96.

Referring again to FIG. 1, the reflector 52 is provided over the plurality of flash lamps FL so as to cover all of the flash lamps FL. A fundamental function of the reflector 52 is to reflect flashes of light emitted from the plurality of flash lamps FL toward the heat treatment space 65. The reflector 52 is a plate made of an aluminum alloy. A surface of the reflector 52 (a surface which faces the flash lamps FL) is roughened by abrasive blasting.

The halogen heating part 4 provided under the chamber 6 includes an enclosure 41 incorporating the multiple (in the present preferred embodiment, 40) halogen lamps HL. The halogen heating part 4 is a light irradiator that directs light from under the chamber 6 through the lower chamber window 64 toward the heat treatment space 65 to heat the semiconductor wafer W by means of the halogen lamps HL.

Figure 7:
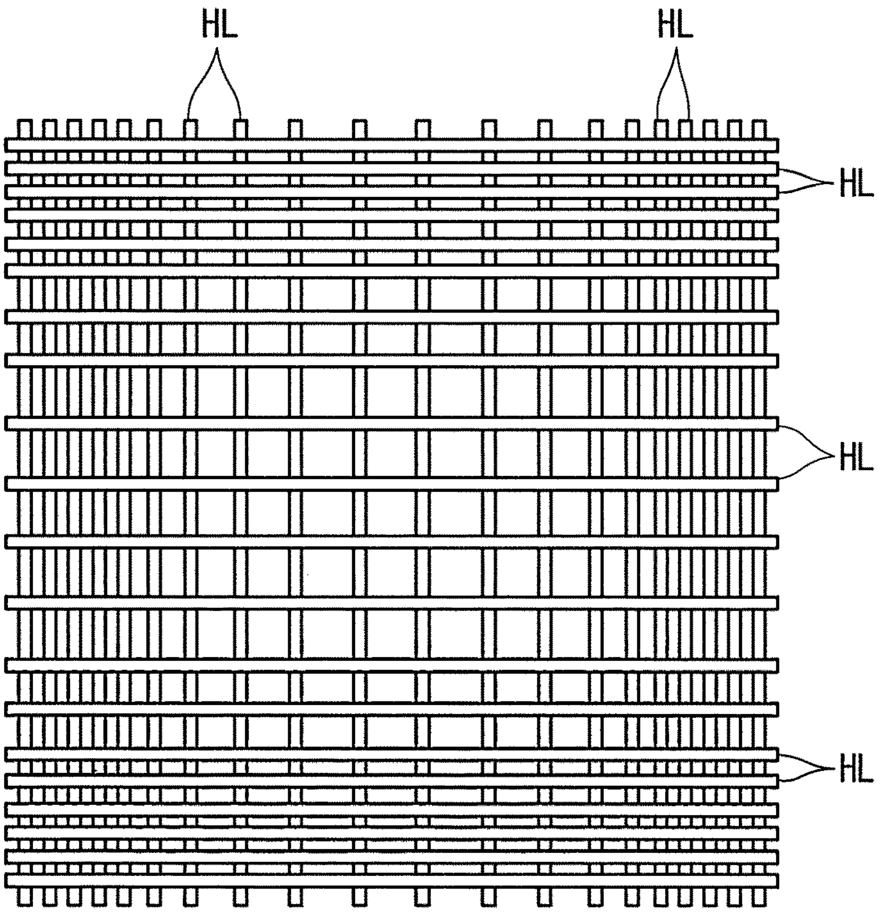
FIG. 7 is a plan view showing an arrangement of halogen lamps.

FIG. 7 is a plan view showing an arrangement of the multiple halogen lamps HL. The 40 halogen lamps HL are arranged in two tiers, i.e. upper and lower tiers. That is, 20 halogen lamps HL are arranged in the upper tier closer to the holder 7, and 20 halogen lamps HL are arranged in the lower tier farther from the holder 7 than the upper tier. Each of the halogen lamps HL is a rod-shaped lamp having an elongated cylindrical shape. The 20 halogen lamps HL in each of the upper and lower tiers are arranged so that the longitudinal directions thereof are in parallel with each other along a main surface of a semiconductor wafer W held by the holder 7 (that is, in a horizontal direction). Thus, a plane defined by the arrangement of the halogen lamps HL in each of the upper and lower tiers is also a horizontal plane.

As shown in FIG. 7, the halogen lamps HL in each of the upper and lower tiers are disposed at a higher density in a region opposed to a peripheral portion of the semiconductor wafer W held by the holder 7 than in a region opposed to a central portion thereof. In other words, the halogen lamps HL in each of the upper and lower tiers are arranged at shorter intervals in a peripheral portion of the lamp arrangement than in a central portion thereof. This allows a greater amount of light to impinge upon the peripheral portion of the semiconductor wafer W where a temperature decrease is prone to occur when the semiconductor wafer W is heated by the irradiation thereof with light from the halogen heating part 4.

The group of halogen lamps HL in the upper tier and the group of halogen lamps HL in the lower tier are arranged to intersect each other in a lattice pattern. In other words, the 40 halogen lamps HL in total are disposed so that the longitudinal direction of the 20 halogen lamps HL arranged in the upper tier and the longitudinal direction of the 20 halogen lamps HL arranged in the lower tier are orthogonal to each other.

Each of the halogen lamps HL is a filament-type light source which passes current through a filament disposed in a glass tube to make the filament incandescent, thereby emitting light. A gas prepared by introducing a halogen element (iodine, bromine and the like) in trace amounts into an inert gas such as nitrogen, argon and the like is sealed in the glass tube. The introduction of the halogen element allows the temperature of the filament to be set at a high temperature while suppressing a break in the filament. Thus, the halogen lamps HL have the properties of having a longer life than typical incandescent lamps and being capable of continuously emitting intense light. That is, the halogen lamps HL are continuous lighting lamps that emit light continuously for not less than one second. In addition, the halogen lamps HL, which are rod-shaped lamps, have a long life. The arrangement of the halogen lamps HL in a horizontal direction provides good efficiency of radiation toward the semiconductor wafer W provided over the halogen lamps HL.

A reflector 43 is provided also inside the enclosure 41 of the halogen heating part 4 under the halogen lamps HL arranged in two tiers (FIG. 1). The reflector 43 reflects the light emitted from the halogen lamps HL toward the heat treatment space 65.

Figure 9:
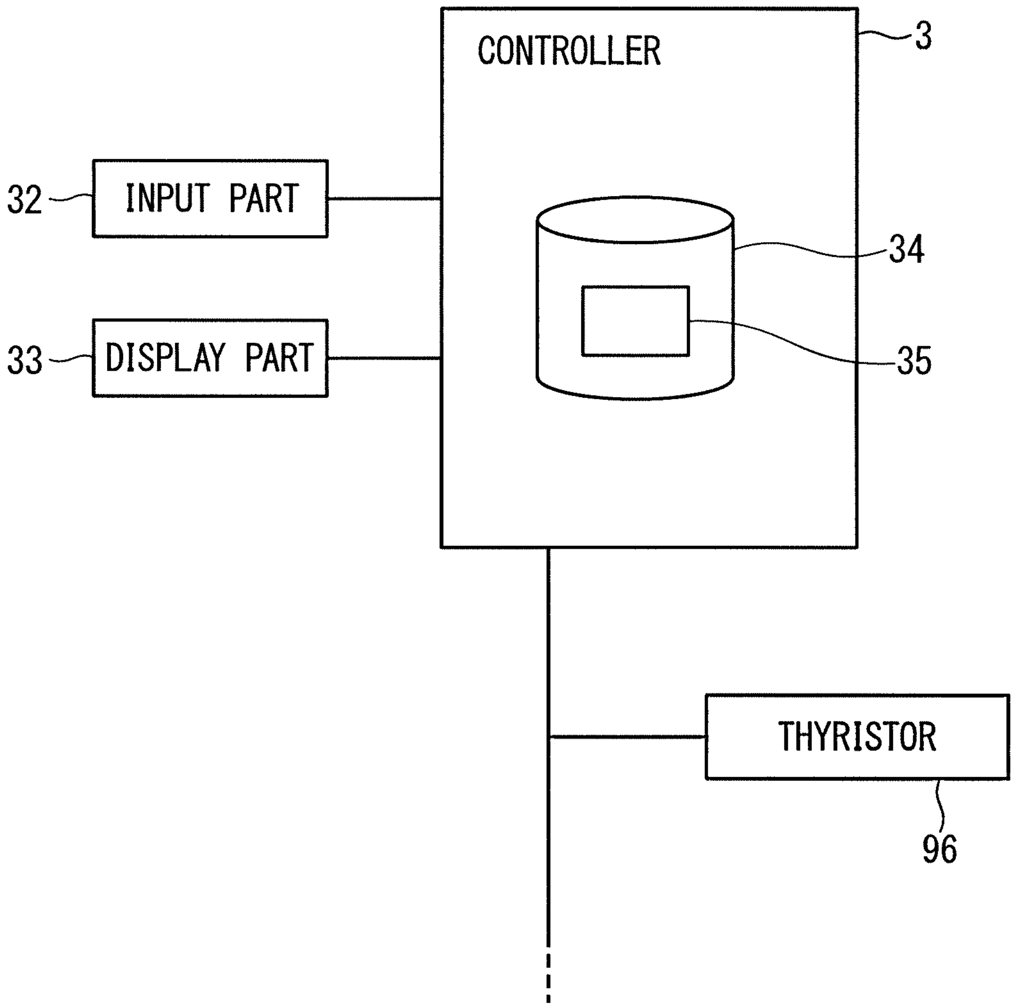
FIG. 9 is a block diagram showing a configuration of a controller.

The controller 3 controls the aforementioned various operating mechanisms provided in the heat treatment apparatus 1. FIG. 9 is a block diagram showing a configuration of the controller 3. The controller 3 is similar in hardware configuration to a typical computer. Specifically, the controller 3 includes a CPU that is a circuit for performing various computation processes, a ROM or read-only memory for storing a basic program therein, a RAM or readable/writable memory for storing various pieces of information therein, and a storage part 34 (e.g., a magnetic disk or an SSD) for storing control software, data and the like therein. The CPU in the controller 3 executes a predetermined processing program, whereby the processes in the heat treatment apparatus 1 proceed.

A treatment recipe 35 which specifies the procedure and conditions for processing or treating the semiconductor wafer W is stored in the storage part 34 of the controller 3. For example, an operator of the heat treatment apparatus 1 enters the treatment recipe 35 via an input part 32 to be described later to store the treatment recipe 35 in the storage part 34, whereby the heat treatment apparatus 1 acquires the treatment recipe 35. Alternatively, the treatment recipe 35 may be transferred via communications from a host computer which manages a plurality of heat treatment apparatuses 1 to the heat treatment apparatus 1 and stored in the storage part 34.

The controller 3 is electrically connected to elements including the thyristor 96 and the like. The controller 3 controls the discharge circuit for the flash lamps FL, for example, in accordance with the details of the treatment recipe 35. Specifically, the controller 3 controls a signal to be applied to the gate of the thyristor 96 to switch the thyristor 96 to the ON state (conducting state) or the OFF state (cut-off state).

The controller 3 is also connected to a display part 33 and the input part 32. The display part 33 and the input part 32 function as a user interface for the heat treatment apparatus 1. The controller 3 causes a variety of pieces of information to appear on the display part 33. An operator of the heat treatment apparatus 1 may input various commands and parameters from the input part 32 while viewing the information appearing on the display part 33. A keyboard and a mouse, for example, may be used as the input part 32. A liquid crystal display, for example, may be used as the display part 33. In the present preferred embodiment, a liquid crystal touch panel provided on an outer wall of the heat treatment apparatus 1 is used to function as both the display part 33 and the input part 32.

The heat treatment apparatus 1 further includes, in addition to the aforementioned components, various cooling structures to prevent an excessive temperature increase in the halogen heating part 4, the flash heating part 5, and the chamber 6 because of the heat energy generated from the halogen lamps HL and the flash lamps FL during the heat treatment of a semiconductor wafer W. As an example, a water cooling tube (not shown) is provided in the walls of the chamber 6. Also, the halogen heating part 4 and the flash heating part 5 have an air cooling structure for forming a gas flow therein to exhaust heat. Air is supplied to a gap between the upper chamber window 63 and the lamp light radiation window 53 to cool down the flash heating part 5 and the upper chamber window 63.

Next, a treatment operation in the heat treatment apparatus 1 will be described. The semiconductor wafer W to be treated is a semiconductor substrate doped with impurities (ions) by an ion implantation process. The impurities are activated by the heat treatment apparatus 1 performing the process of heating (annealing) the semiconductor wafer W by irradiation with flashes of light. The procedure for the treatment in the heat treatment apparatus 1 which will be described below proceeds under the control of the controller 3 over the operating mechanisms of the heat treatment apparatus 1.

First, the valve 84 for supply of gas is opened, and the valves 89 and 192 for exhaust of gas are opened, so that the supply and exhaust of gas into and out of the chamber 6 start. When the valve 84 is opened, nitrogen gas is supplied through the gas supply opening 81 into the heat treatment space 65. When the valve 89 is opened, the gas within the chamber 6 is exhausted through the gas exhaust opening 86. This causes the nitrogen gas supplied from an upper portion of the heat treatment space 65 in the chamber 6 to flow downwardly and then to be exhausted from a lower portion of the heat treatment space 65.

The gas within the chamber 6 is exhausted also through the transport opening 66 by opening the valve 192. Further, the exhaust mechanism not shown exhausts an atmosphere near the drivers of the transfer mechanism 10. It should be noted that the nitrogen gas is continuously supplied into the heat treatment space 65 during the heat treatment of a semiconductor wafer W in the heat treatment apparatus 1. The amount of nitrogen gas supplied into the heat treatment space 65 is changed as appropriate in accordance with process steps.

Subsequently, the gate valve 185 is opened to open the transport opening 66. A transport robot outside the heat treatment apparatus 1 transports the semiconductor wafer W to be treated through the transport opening 66 into the heat treatment space 65 of the chamber 6. At this time, there is a danger that an atmosphere outside the heat treatment apparatus 1 is carried into the heat treatment space 65 as the semiconductor wafer W is transported into the heat treatment space 65. However, the nitrogen gas is continuously supplied into the chamber 6. Thus, the nitrogen gas flows outwardly through the transport opening 66 to minimize the outside atmosphere carried into the heat treatment space 65.

The semiconductor wafer W transported into the heat treatment space 65 by the transport robot is moved forward to a position lying immediately over the holder 7 and is stopped thereat. Then, the pair of transfer arms 11 of the transfer mechanism 10 is moved horizontally from the retracted position to the transfer operation position and is then moved upwardly, whereby the lift pins 12 pass through the through holes 79 and protrude from the upper surface of the holding plate 75 of the susceptor 74 to receive the semiconductor wafer W. At this time, the lift pins 12 move upwardly to above the upper ends of the substrate support pins 77.

After the semiconductor wafer W is placed on the lift pins 12, the transport robot moves out of the heat treatment space 65, and the gate valve 185 closes the transport opening 66. Then, the pair of transfer arms 11 moves downwardly to transfer the semiconductor wafer W from the transfer mechanism 10 to the susceptor 74 of the holder 7, so that the semiconductor wafer W is held in a horizontal attitude from below. The semiconductor wafer W is supported by the substrate support pins 77 provided upright on the holding plate 75, and is held by the susceptor 74. The semiconductor wafer W is held by the holder 7 in such an attitude that the front surface thereof patterned and implanted with the impurities is the upper surface. A predetermined distance is defined between a back surface (a main surface opposite from the front surface) of the semiconductor wafer W supported by the substrate support pins 77 and the holding surface 75*a* of the holding plate 75. The pair of transfer arms 11 moved downwardly below the susceptor 74 is moved back to the retracted position, i.e. to the inside of the recessed portion 62, by the horizontal movement mechanism 13.

After the semiconductor wafer W is held from below in a horizontal attitude by the susceptor 74 of the holder 7 made of quartz, the 40 halogen lamps HL in the halogen heating part 4 turn on simultaneously to start preheating (or assist-heating). Halogen light emitted from the halogen lamps HL is transmitted through the lower chamber window 64 and the susceptor 74 both made of quartz, and impinges upon the lower surface of the semiconductor wafer W. By receiving light irradiation from the halogen lamps HL, the semiconductor wafer W is preheated, so that the temperature of the semiconductor wafer W increases. It should be noted that the transfer arms 11 of the transfer mechanism 10, which are retracted to the inside of the recessed portion 62, do not become an obstacle to the heating using the halogen lamps HL.

The temperature of the semiconductor wafer W is measured by the lower radiation thermometer 20 when the halogen lamps HL perform the preheating. Specifically, the lower radiation thermometer 20 receives infrared radiation emitted from the lower surface of the semiconductor wafer W held by the susceptor 74 through the opening 78 and passing through the transparent window 21 to measure the temperature of the semiconductor wafer W which is on the increase. The measured temperature of the semiconductor wafer W is transmitted to the controller 3. The controller 3 controls the output from the halogen lamps HL while monitoring whether the temperature of the semiconductor wafer W which is on the increase by the irradiation with light from the halogen lamps HL reaches a predetermined preheating temperature T1 or not. In other words, the controller 3 effects feedback control of the output from the halogen lamps HL so that the temperature of the semiconductor wafer W is equal to the preheating temperature T1, based on the value measured by the lower radiation thermometer 20. In this manner, the lower radiation thermometer 20 is a radiation thermometer for controlling the temperature of the semiconductor wafer W during the preheating. The preheating temperature T1 shall be on the order of 200° to 800° C., preferably on the order of 350° to 600° C., (in the present preferred embodiment, 400° C.) at which there is no apprehension that the impurities implanted in the semiconductor wafer W are diffused by heat.

After the temperature of the semiconductor wafer W reaches the preheating temperature T1, the controller 3 maintains the temperature of the semiconductor wafer W at the preheating temperature T1 for a short time. Specifically, at the point in time when the temperature of the semiconductor wafer W measured by the lower radiation thermometer 20 reaches the preheating temperature T1, the controller 3 adjusts the output from the halogen lamps HL to maintain the temperature of the semiconductor wafer W at approximately the preheating temperature T1.

By performing such preheating using the halogen lamps HL, the temperature of the entire semiconductor wafer W is uniformly increased to the preheating temperature T1. In the stage of preheating using the halogen lamps HL, the semiconductor wafer W shows a tendency to be lower in temperature in a peripheral portion thereof where heat dissipation is liable to occur than in a central portion thereof. However, the halogen lamps HL in the halogen heating part 4 are disposed at a higher density in the region opposed to the peripheral portion of the semiconductor wafer W than in the region opposed to the central portion thereof. This causes a greater amount of light to impinge upon the peripheral portion of the semiconductor wafer W where heat dissipation is liable to occur, thereby providing a uniform in-plane temperature distribution of the semiconductor wafer W in the stage of preheating.

The flash lamps FL irradiate the front surface of the semiconductor wafer W with a flash of light at the point in time when a predetermined time period has elapsed since the temperature of the semiconductor wafer W reached the preheating temperature T1. At this time, part of the flash of light emitted from the flash lamps FL travels directly toward the interior of the chamber 6. The remainder of the flash of light is reflected once from the reflector 52, and then travels toward the interior of the chamber 6. The irradiation of the semiconductor wafer W with such flashes of light achieves the flash heating of the semiconductor wafer W.

For the flash irradiation from the flash lamps FL, the power supply unit 95 applies a predetermined charging voltage to the capacitor 93 in advance to accumulate an electric charge in the capacitor 93. The amount of electric charge stored in the capacitor 93 is defined by the product of the capacitance C of the capacitor 93 and the charging voltage V applied by the power supply unit 95.

With the electrical charge stored in the capacitor 93, a positive signal is provided to the gate of the thyristor 96 to turn on the thyristor 96 under the control of the controller 3. In synchronism with the turning on of the thyristor 96, a high voltage (trigger voltage) is applied to the trigger electrode 91 under the control of the controller 3. The thyristor 96 turns on, with the electrical charge stored in the capacitor 93, and the high voltage is applied to the trigger electrode 91 in synchronism with the turning on of the thyristor 96, whereby current flows across the electrodes of the glass tube 92. The resultant excitation of xenon atoms or molecules induces light emission, so that the flash lamps FL emit a flash of light. In this manner, the 63 flash lamps FL of the flash heating part 5 emit light, so that the front surface of the semiconductor wafer W held by the holder 7 is irradiated with flashes of light, and is hence heated. In the present preferred embodiment, the 21 thyristors 96 turn on simultaneously, and the high voltage is applied to the trigger electrodes 91 of the 63 flash lamps FL simultaneously.

Figure 10:
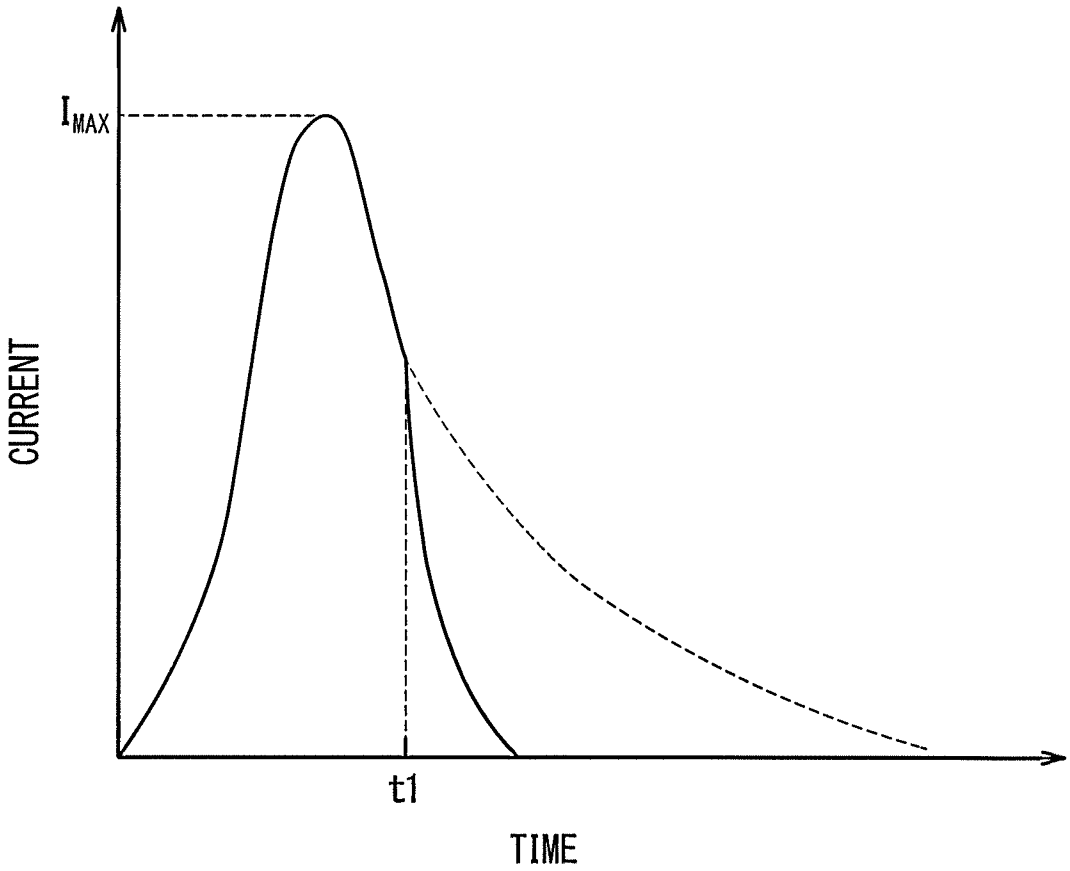
FIG. 10 is a graph showing changes in current flowing through the flash lamps.

FIG. 10 is a graph showing changes in current flowing through the flash lamps FL. At the same time that the thyristor 96 turns on, current starts flowing through the flash lamps FL. The waveform of the current flowing through the flash lamps FL while the thyristor 96 is in the ON state is defined by the capacitance C of the capacitor 93, the inductance L of the coil 94, the charging voltage V, and the like. In the present preferred embodiment, the maximum value $I_{MAX}$ of the current flowing through the flash lamps FL reaches approximately 4000 A.

At time t1 when 0.1 msec has elapsed since the thyristor 96 turned on and the current started flowing through the flash lamps FL, a negative signal is provided to the gate of the thyristor 96 to turn off the thyristor 96 under the control of the controller 3. By turning off the thyristor 96, the discharge current flowing through the flash lamps FL is forcibly cut off, so that the flash lamps FL stop emitting light.

The dotted curve after the time t1 in FIG. 10 indicates the waveform of the current flowing through the flash lamps FL in the case where the flash lamps FL emit light without the provision of the thyristor 96. As indicated by the dotted curve in FIG. 10, if the thyristor 96 is not provided, a tail current continues to flow for a relatively long time because the current flowing through the flash lamps FL is not forcibly cut off. Thus, the front surface of the semiconductor wafer W continues to be heated after the time t1. This decreases the temperature decrease rate of the semiconductor wafer W after the flash irradiation to inhibit lower thermal history.

The solid curve after the time t1 in FIG. 10 indicates changes in current in the present preferred embodiment when the thyristor 96 turns off. The current flowing through the flash lamps FL is forcibly cut off by turning off the thyristor 96, whereby the tail current is significantly suppressed, as compared to the dotted curve in FIG. 10. As a result, the semiconductor wafer W is hardly heated after the time t1 when the thyristor 96 turns off. This reduces the total amount of heat inputted to the semiconductor wafer W to achieve the annealing with low thermal history. In addition, the increase in temperature decrease rate of the semiconductor wafer W after the time t1 is also achieved.

However, there is a danger that a coil surge is generated such that an instantaneous large voltage is generated in the reverse direction in the coil 94 by an abrupt change in current, when the thyristor 96 turns off. To prevent this, the regeneration diode 97 is provided in the discharge circuit so as to absorb the high voltage due to the coil surge (FIG. 8). Although the regeneration diode 97 is able to protect the elements in the discharge circuit from the coil surge, the current caused by the voltage generated in the coil 94 flows through the regeneration diode 97 and the flash lamps FL even after the thyristor 96 turns off, so that a slight tail current will remain, as shown in FIG. 10.

The current with the waveform as shown in FIG. 10 flows through the flash lamps FL to cause the flash lamps FL to emit light. Thus, the front surface of the semiconductor wafer W is irradiated with flashes of light from the 63 flash lamps FL for an irradiation time period of approximately 0.1 msec. The temperature of the front surface of the semiconductor wafer W instantaneously increases to a treatment temperature T2 and then decreases rapidly. In the present preferred embodiment, the treatment temperature T2 is 1000° C. That is, a large current of up to 4000 A instantaneously passes through the 63 flash lamps FL, whereby the front surface temperature of the semiconductor wafer W is increased by approximately 600° C. by the flash irradiation for an irradiation time period of approximately 0.1 msec in the present preferred embodiment. This allows the activation of the impurities implanted in the semiconductor wafer W while suppressing the thermal diffusion of the impurities.

After a predetermined time period has elapsed since the stop of the current supply to the flash lamps FL, the halogen lamps HL turn off. This causes the temperature of the semiconductor wafer W to decrease rapidly from the preheating temperature T1. The lower radiation thermometer 20 measures the temperature of the semiconductor wafer W which is on the decrease. The result of measurement is transmitted to the controller 3. The controller 3 monitors whether the temperature of the semiconductor wafer W is decreased to a predetermined temperature or not, based on the result of measurement by means of the lower radiation thermometer 20. After the temperature of the semiconductor wafer W is decreased to the predetermined temperature or below, the pair of transfer arms 11 of the transfer mechanism 10 is moved horizontally again from the retracted position to the transfer operation position and is then moved upwardly, so that the lift pins 12 protrude from the upper surface of the susceptor 74 to receive the heat-treated semiconductor wafer W from the susceptor 74. Subsequently, the transport opening 66 which has been closed is opened by the gate valve 185, and the transport robot outside the heat treatment apparatus 1 transports the semiconductor wafer W placed on the lift pins 12 to the outside. Thus, the heating treatment of the semiconductor wafer W in the heat treatment apparatus 1 is completed.

In the present preferred embodiment, the capacitance C of the capacitor 93, the inductance L of the coil 94, the charging voltage V to the capacitor 93, and the like are adjusted, whereby the flash lamps FL are instantaneously discharged with a large current of up to 4000 A, and the irradiation time period of the flash lamps FL is as extremely short as approximately 0.1 msec. Although the irradiation time period is as extremely short as approximately 0.1 msec for the flash irradiation, the front surface temperature of the semiconductor wafer W is increased by approximately 600° C. from the preheating temperature T1 by passing a large current of up to 4000 A through the 63 flash lamps FL. This allows the front surface temperature of the semiconductor wafer W to instantaneously increase to a high temperature, while keeping the amount of heat inputted to the semiconductor wafer W low (low thermal history), thereby achieving the high activation and diffusion prevention of the impurities implanted in the front surface of the semiconductor wafer W.

In other words, the provision of the 63 flash lamps FL to be discharged with a large current of up to 4000 A is required to increase the front surface temperature of the semiconductor wafer W by 600° C. by the flash irradiation for an irradiation time period of approximately 0.1 msec. If individual element sets are provided for the 63 flash lamps FL, it is necessary to provide at least 63 thyristors 96, at least 63 capacitors 93, and the like. This results in a significant increase in apparatus costs and an increase in installation space for the elements.

In the present preferred embodiment, one capacitor 93, one coil 94, one thyristor 96, and one regeneration diode 97 are provided for the three parallel-connected flash lamps FL. In other words, the 21 element sets are provided for the 63 flash lamps FL. This reduces the number of elements provided in the heat treatment apparatus 1, as compared to the case in which individual element sets are provided for the flash lamps FL, thereby suppressing the increase in apparatus cost and reducing the installation space for the elements.

When one thyristor 96 and the like are connected to three parallel-connected flash lamps FL as in the circuit configuration of FIG. 8, all of the currents flowing through the three flash lamps FL will flow to the one thyristor 96. For example, when a maximum current of 4000 A flows through each of the flash lamps FL as in the aforementioned example, a large current of 12000 A will flow to the thyristor 96.

The thyristor 96 of the present preferred embodiment is a GCT thyristor. The ON-state current of a typical GCT thyristor is 6000 A. In accordance with ON-state current standards, two parallel-connected flash lamps FL through each of which the current of up to 4000 A flows cannot be connected to one thyristor 96. However, the rated surge ON-state current ($I_{TSM}$) of the GCT thyristor is, for example, 50000 A. The rated surge ON-state current refers to the peak value of a non-repetitive 60-Hz half sine wave ON-state current flowable from within a rated junction temperature range. Since a 60-Hz half sine wave is approximately 8 msec, the time period for which current flows through the flash lamps FL during the flash irradiation for an irradiation time period of approximately 0.1 msec in the present preferred embodiment is shorter than the 60-Hz half sine wave. Also, the flash irradiation from the flash lamps FL is non-repetitive. For the flash irradiation, the current allowed to flow is hence up to the rated surge ON-state current of the thyristor 96 if the rated junction temperature is maintained. Then, 12 parallel-connected flash lamps FL through each of which the current of up to 4000 A flows are allowed to be connected to the thyristor 96 which is a GCT thyristor with a rated surge ON-state current of 50000 A by simple calculation of current only. This sufficiently allows the provision of one thyristor 96 for three parallel-connected flash lamps FL and the collective switching of the three flash lamps FL by means of the one thyristor 96.

While the preferred embodiment according to the present invention has been described hereinabove, various modifications of the present invention in addition to those described above may be made without departing from the scope and spirit of the invention. For example, the thyristor 96 is not limited to the GCT thyristor, but may be a GTO thyristor. The GTO thyristor also has the function of turning off by providing a reverse signal to the gate thereof.

An insulated-gate bipolar transistor (IGBT) may also be used in place of the thyristor 96. The IGBT is a semiconductor element which switches between ON and OFF states depending on the signal inputted to the gate thereof. Although the rated current of the IGBT is lower than that of the GCT and GTO thyristors, the IGBT is able to switch between ON and OFF states at high speeds. The GCT thyristor, the GTO thyristor, and the IGBT are all switching elements which turn on and off the current flowing through the flash lamps FL connected thereto. That is, it is sufficient that one switching element is connected to three parallel-connected flash lamps FL and collectively controls the current flowing through the three flash lamps FL.

In the aforementioned preferred embodiment, one element set is provided for three parallel-connected flash lamps FL. The present invention, however, is not limited to this. For example, two element sets may be provided for the three flash lamps FL. Alternatively, one element set may be provided for two or not less than four parallel-connected flash lamps FL. In short, it is sufficient to provide a smaller number of element sets than the number of parallel-connected flash lamps FL, and more precisely, to provide M elements sets for N parallel-connected flash lamps FL (M is an integer less than N, and N is an integer not less than 2). This reduces the number of elements provided in the heat treatment apparatus 1, as compared to the case in which individual element sets are provided for the flash lamps FL, There is a technique known as simmer discharge as a countermeasure to prevent the flash lamps FL from failing to emit light earlier than their lifetime. This is a technique in which main discharge is generated after a state of weak discharge (simmer discharge) is maintained in the glass tube 92 for a while after trigger discharge, rather than making a transition to the main discharge immediately after the trigger discharge. The simmer discharge moves in the direction opposite to gravity over time due to the influence of convection of the xenon gas sealed in the glass tube 92. For this reason, damage to the glass tube 92 is reduced if the main discharge is generated at the time of the movement of a discharge path to near the central axis of the glass tube 92.

For the generation of such simmer discharge, it is necessary to connect a resistor in parallel with the thyristor 96 in the discharge circuit of FIG. 8. Also, a switching element such as an IGBT, a thyristor, or the like is required for the transition from the simmer discharge to the main discharge. In this case, the same effect as in the aforementioned preferred embodiment is also produced by providing a smaller number of switching elements than the number of parallel-connected flash lamps FL. The switching element for the transition from the simmer discharge to the main discharge may be a thyristor capable of only turning on without a turning-off function.

Although the 63 flash lamps FL are provided in the flash heating part 5 according to the aforementioned preferred embodiment, the present invention is not limited to this. Any number of flash lamps FL may be provided. The flash lamps FL are not limited to the xenon flash lamps, but may be krypton flash lamps. Also, the number of halogen lamps HL provided in the halogen heating part 4 is not limited to 40. Any number of halogen lamps HL may be provided.

In the aforementioned preferred embodiment, the filament-type halogen lamps HL are used as continuous lighting lamps that emit light continuously for not less than one second to perform the preheating of the semiconductor wafer W. The present invention, however, is not limited to this. In place of the halogen lamps HL, discharge type arc lamps (e.g., xenon arc lamps) or LED lamps may be used as the continuous lighting lamps to perform the preheating.

The process performed in the heat treatment apparatus 1 is not limited to the heat treatment for the activation of impurities. The heat treatment apparatus 1 may perform the heat treatment of high dielectric constant gate insulator films (high-k films), the joining of metal and silicon, or the crystallization of polysilicon.

While the invention has been shown and described in detail, the foregoing description is in all aspects illustrative and not restrictive. It is therefore understood that numerous modifications and variations can be devised without departing from the scope of the invention.

What is claimed is:

1. A heat treatment apparatus for irradiating a substrate with a flash of light to heat the substrate, comprising:

a chamber for receiving a substrate therein;

a holder for holding said substrate in said chamber;

a plurality of flash lamps for irradiating said substrate held by said holder with a flash of light;

a discharge circuit for passing current of 4,000 amps or less through said plurality of flash lamps to cause said plurality of flash lamps to emit light; and a controller for controlling said discharge circuit, said discharge circuit including a single one element set coupled to and controlling N parallel-connected flash lamps, where N is an integer not less than 2, wherein said one element set includes a single switching element for controlling current flowing through said N flash lamps, and further includes a single coil, a single capacitor, and a single diode.

2. The heat treatment apparatus according to claim 1, wherein said switching element is a thyristor.

3. The heat treatment apparatus according to claim 2, wherein said thyristor is a GTO thyristor or a GCT thyristor.

4. The heat treatment apparatus according to claim 1, wherein said switching element is an IGBT.

* * * * *